United States Patent
Yoon Lee et al.

(10) Patent No.: US 10,237,115 B2
(45) Date of Patent: Mar. 19, 2019

(54) ROLE BASED CONFIGURATION AND MANAGEMENT TOOL BASED ON SNMP AND LDAP

(71) Applicants: Alvin Yoon Lee, Dallas, TX (US); Kenneth Ellington, Carrollton, TX (US); Lawrence Lee, McKinney, TX (US); David Helsley, McKinney, TX (US); Ryan Cerrato, Rockwall, TX (US); Faisal Rabbani, Euless, TX (US); Leland Townsend, Plano, TX (US); Aaron McKay, Plano, TX (US); Walter Brekeen, Jr., Mansfield, TX (US); Ronnie Mathes, Frisco, TX (US)

(72) Inventors: Alvin Yoon Lee, Dallas, TX (US); Kenneth Ellington, Carrollton, TX (US); Lawrence Lee, McKinney, TX (US); David Helsley, McKinney, TX (US); Ryan Cerrato, Rockwall, TX (US); Faisal Rabbani, Euless, TX (US); Leland Townsend, Plano, TX (US); Aaron McKay, Plano, TX (US); Walter Brekeen, Jr., Mansfield, TX (US); Ronnie Mathes, Frisco, TX (US)

(73) Assignee: CA, Inc., New York, NY (US)

( * ) Notice: Subject to any disclaimer, the term of this patent is extended or adjusted under 35 U.S.C. 154(b) by 305 days.

(21) Appl. No.: 14/937,261

(22) Filed: Nov. 10, 2015

(65) Prior Publication Data

US 2017/0134211 A1    May 11, 2017

(51) Int. Cl.
 H04L 12/24    (2006.01)
 H04L 29/12    (2006.01)
 H04L 29/06    (2006.01)

(52) U.S. Cl.
 CPC ...... H04L 41/0213 (2013.01); H04L 61/1523 (2013.01); H04L 63/10 (2013.01); *H04L 61/6068* (2013.01)

(58) Field of Classification Search
 None
 See application file for complete search history.

(56) References Cited

U.S. PATENT DOCUMENTS

| | | | | |
|---|---|---|---|---|
| 6,490,617 B1* | 12/2002 | Hemphill | ............ | H04L 41/0213 709/223 |
| 6,587,874 B1* | 7/2003 | Golla | ............ | H04L 41/08 707/999.1 |
| 7,206,827 B2* | 4/2007 | Viswanath | ............ | G06F 9/505 709/213 |
| 7,478,153 B2 | 1/2009 | Page et al. | | |

(Continued)

*Primary Examiner* — Patrice L Winder
(74) *Attorney, Agent, or Firm* — Baker Botts L.L.P.

(57) ABSTRACT

A method is described for determining automatically, via a network protocol, a system topology of a network system, wherein the network system comprises a plurality of network components, wherein each of the network components support a directory protocol, and wherein the system topology comprises a respective address of each of the plurality of network components. The system topology is mapped via the directory protocol. Finally, a role-based access credential is configured for a user, via the directory protocol, wherein the role-based access credential determines which of the plurality of network components are accessible to the user.

20 Claims, 5 Drawing Sheets

(56) References Cited

U.S. PATENT DOCUMENTS

| | | | | |
|---|---|---|---|---|
| 7,698,394 B2* | 4/2010 | Helmerich | ......... | H04L 41/0843 |
| | | | | 709/222 |
| 8,880,669 B2* | 11/2014 | Ramaswamy | .......... | H04L 41/12 |
| | | | | 709/223 |
| 9,100,296 B1* | 8/2015 | Kishore | ................... | H04L 63/20 |
| 9,887,978 B2* | 2/2018 | Goel | ....................... | H04L 63/08 |
| 2003/0191781 A1* | 10/2003 | Civanlar | ........... | H04L 29/12009 |
| 2006/0129415 A1* | 6/2006 | Thukral | ............... | G06Q 10/087 |
| | | | | 705/28 |
| 2007/0061125 A1* | 3/2007 | Bhatt | .................... | G06F 21/577 |
| | | | | 703/20 |
| 2009/0070571 A1* | 3/2009 | Neely | ................ | G07C 9/00134 |
| | | | | 713/1 |
| 2009/0210523 A1* | 8/2009 | Duggan | ................. | H04L 41/12 |
| | | | | 709/223 |
| 2009/0290513 A1* | 11/2009 | Swan | .................. | H04L 41/0213 |
| | | | | 370/255 |
| 2009/0307753 A1* | 12/2009 | Dupont | ............... | H04L 12/2872 |
| | | | | 726/3 |
| 2011/0167483 A1* | 7/2011 | Lee | ..................... | H04L 63/0823 |
| | | | | 726/6 |
| 2012/0239797 A1* | 9/2012 | Agrawal | ............... | H04L 41/145 |
| | | | | 709/224 |
| 2014/0207917 A1* | 7/2014 | Tock | ................... | H04L 41/0893 |
| | | | | 709/220 |
| 2015/0188919 A1* | 7/2015 | Belton, Jr. | .......... | H04M 3/2263 |
| | | | | 726/4 |

* cited by examiner

ROLE BASED CONFIGURATION AND MANAGEMENT TOOL BASED ON SNMP AND LDAP

BACKGROUND

The present disclosure relates to interfaces and, in particular, to a system, a computer program product, and method for determining and configuring a system topology of a plurality of network components

SUMMARY

According to an embodiment of the present disclosure, a method is disclosed comprising determining automatically, via a network protocol, a system topology of a network system, wherein the network system comprises a plurality of network components, wherein each of the network components support a directory protocol, and wherein the system topology comprises a respective address of each of the plurality of network components. The method further comprising mapping the system topology via the directory protocol. The method further comprising configuring a role-based access credential for a user, via the directory protocol, wherein the role-based access credential determines which of the plurality of network components are accessible to the user.

According to another embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-5, like numerals being used for corresponding parts in the various drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Current cloud storage systems span multiple operating systems and hardware platforms. Resource administrators manually configure each new device added to a networked environment. As a result, administrators often struggle to efficiently manage these resources, which are constantly in flux as new devices are added to the system and current devices are relocated within the system. In addition, as new features are added to a network device, administrators are often required to reconfigure the network device. It becomes clear that the burden on administrators to maintain network configuration becomes cumbersome as a network increases in size.

In addition, with broad system resources, administrators often manage several access credentials to log onto each of zOS, cloud provider, Linux, network-attached storage (NAS) appliance, etc. As a result, administrators, especially those unfamiliar with Linux and/or Command Line Interface, have difficulty identifying problems across the network resources.

Accordingly, there is a need in the marketplace for a system that can determine and map a system topology of a network system in order to better assist administrators in pinpointing system issues and configuring role-based access. The present disclosure provides, inter alia, a method to automatically determine a system topology via a network protocol and map the system topology via a directory protocol. The present disclosure further describes, inter alia, configuring role-based access credentials for users to access portions of the system. This unique solution may be extended to applications, databases, storage, etc. Embodiments of the present disclosure may address the above problems, and other problems, individually and collectively.

Figure 1:
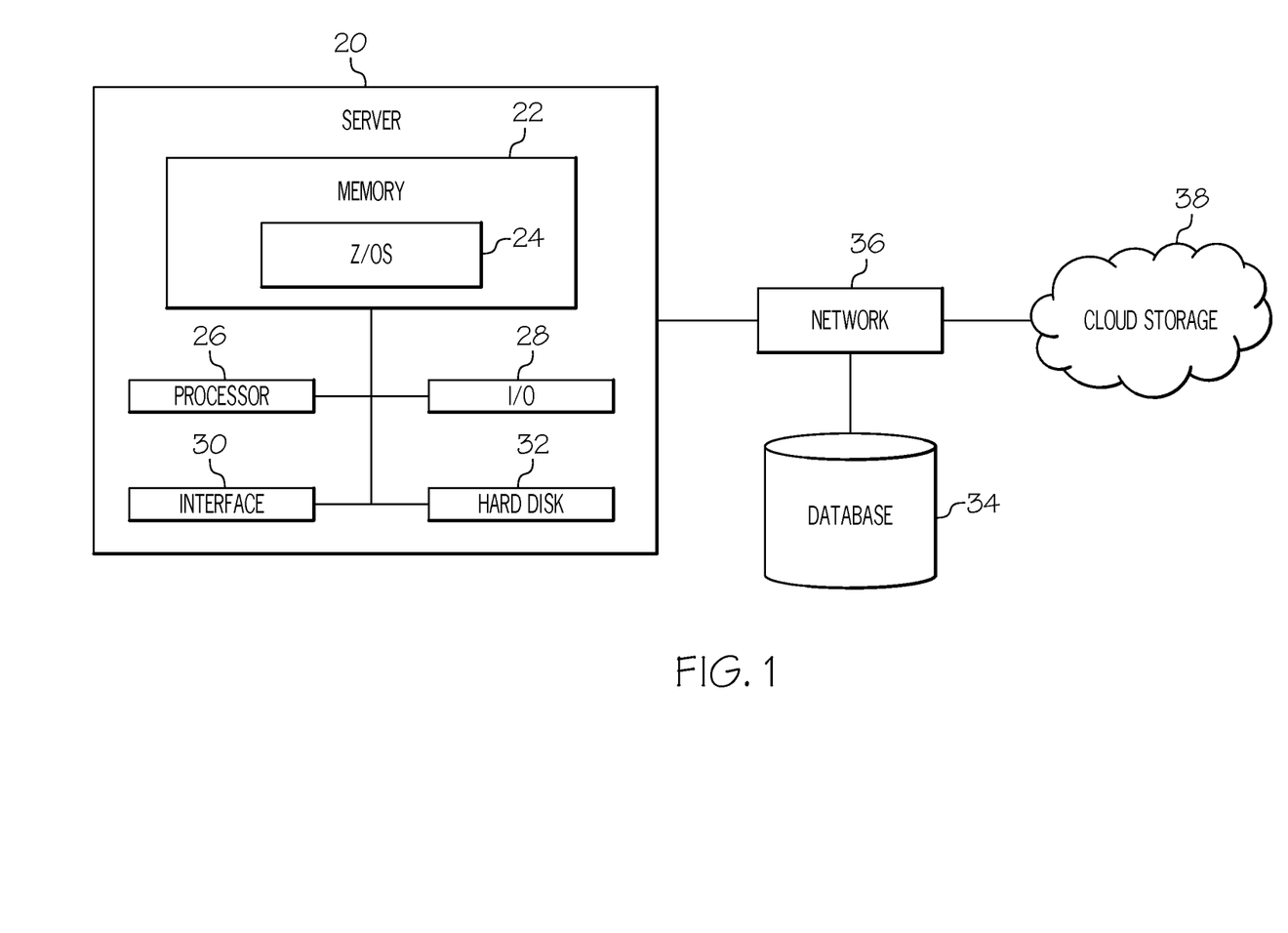
FIG. 1 illustrates a network ecosystem of a non-limiting embodiment of the present disclosure.

FIG. 1 illustrates a network ecosystem of a non-limiting embodiment of the present disclosure. The storage ecosystem may include a server 20, a memory 22, an operating system 24 (e.g., z/OS), a processor 26, an interface 30, an input and output ("I/O") device 28, and a hard disk 32. Operating system 24 analyses may take place on the server 20 shown in FIG. 1. Processor 26 may be operable to load instructions from hard disk 32 into memory 22 and execute those instructions. Memory 22 may store computer-readable instructions that may instruct the server 20 to perform certain processes. I/O device 28 may receive one or more of data from another server, local database 34, or a network 36. The server 20 may be considered a processing system. Furthermore, operating system 24 may perform analysis on any processing system, wherein the processing system comprises one or more processors. Operating system 24 may include, for example, Windows X, Linux, z/OS, z/Linux, etc., or any combination thereof. The operating system 24 may utilize Simple Network Management Protocol (SNMP) to monitor network-attached devices for conditions that warrant administrative attention.

Network 36 may comprise one or more entities, which may be public, private, or community based. Network 36 may permit the exchange of information and services among users/entities that are connected to such network 36. In certain configurations, network 36 may be a local area network, such as an intranet. Further, network 36 may be a closed private network/cloud in certain configurations and an open network/cloud in other configurations. Network 36 may facilitate wired or wireless communications of information and provisioning of services among users that are connected to network 36.

The network ecosystem may also include a local database 34 which may include, for example, additional servers, data storage, and resources. Operating system 24 may receive additional data from local database 34. Operating system 24 may also store system performance, system analysis, and any information regarding server or network management on the local database 34. Operating system 24 may also store information regarding system file read and write operations, as well as any data regarding transferring information external to the server 20. Cloud storage 38 may span multiple operating systems and hardware platforms.

Figure 2:
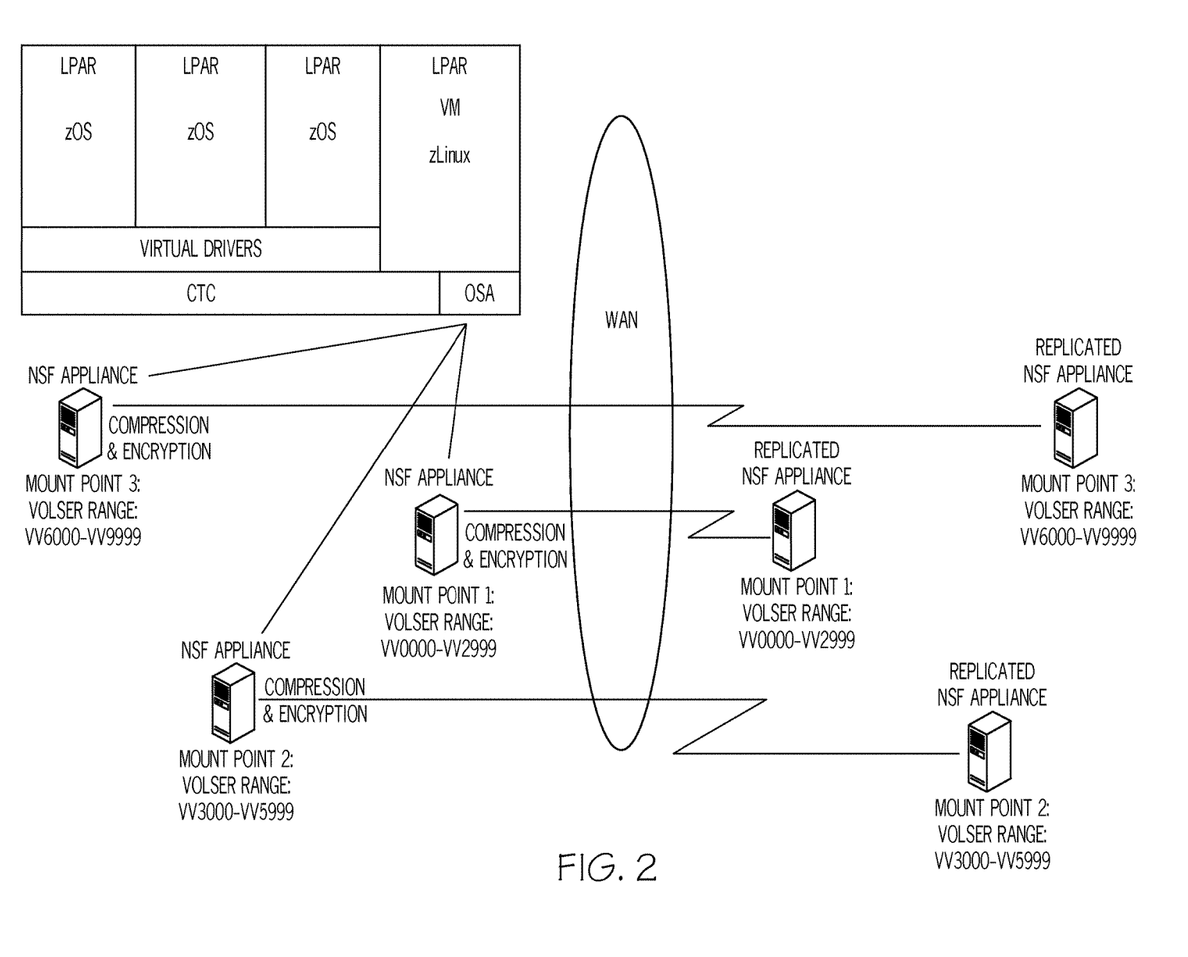
FIG. 2 illustrates a system topology of a non-limiting embodiment of the present disclosure.

FIG. 2 illustrates a system topology of a non-limiting embodiment of the present disclosure. A system may consist of several logical partitions (LPAR's) to divide processors, memory, and storage such that each LPAR may operate independently with its own OS. In addition, an open systems adapter (OSA) may connect an operating system with multiple network file system (NFS) appliances of differing volume serial numbers.

Furthermore in FIG. 2, the appliances may be replicated for access and configuration via a wide area network (WAN) or any other similar means. The replicated NFS appliances may be reorganized, reconfigured, deleted, or added to, and any such modification will be reflected on the original NFS appliance network. The original NFS appliances may be at a physical location, on Amazon Web Services, NetApp, etc.

Figure 3:
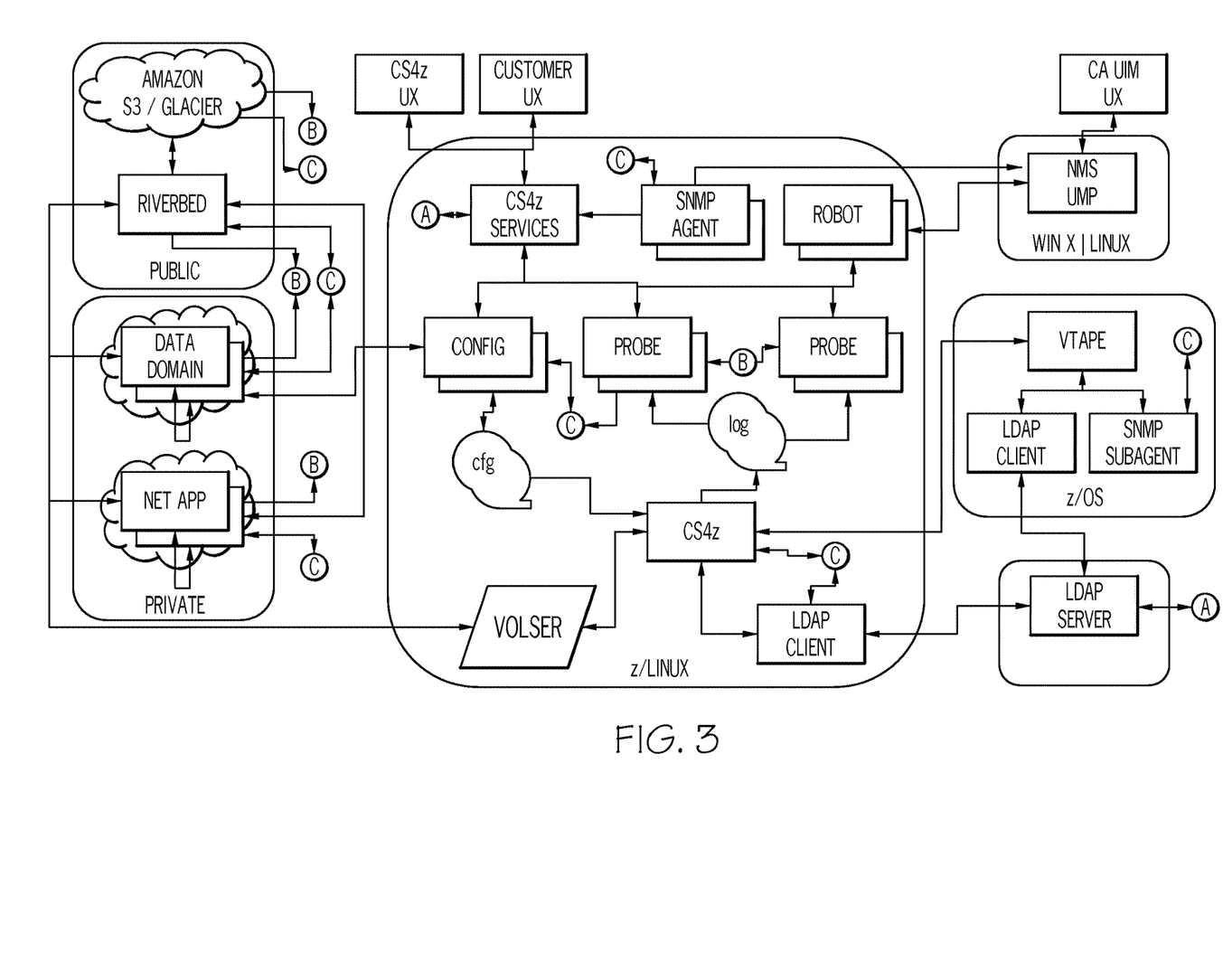
FIG. 3 illustrates a network ecosystem including network protocol interaction of a non-limiting embodiment of the present disclosure.

FIG. 3 illustrates a network ecosystem including network protocol interaction of a non-limiting embodiment of the present disclosure. System topology may be automatically discovered through SNMP probing. For example, a subnet mask may be utilized to probe for systems that respond. From the responsive systems, unique SNMP variables may respond with descriptions of current system components and operating system. Such an auto-discovery process assists system administrators define system topology and configuration within LDAP. Furthermore, network components may be monitored via SNMP for a variation in any respective configuration parameter, such as, for example, an address of the network component. A subnet mask may be used to determine any such variation. In response to determining such a variation, the network protocol may instruct and/or inform a network component to refresh the respective configuration parameter data on the directory protocol.

After discovery, the system topology may be published to a Lightweight Directory Access Protocol (LDAP) server. The LDAP server may implement security and/or role-based access credentials on individual fields of the system topology to help administrators regulate access to resources. In addition, an administrator may make further configuration changes against the LDAP server. Furthermore, an administrator may use SNMP writable object identifiers (OID's) to instruct a component to re-access the LDAP server and refresh its copy of the settings and changes accordingly. This configuration and management process works across multiple platforms including, for example, Linux, z/OS, and NAS appliances.

Figure 4:
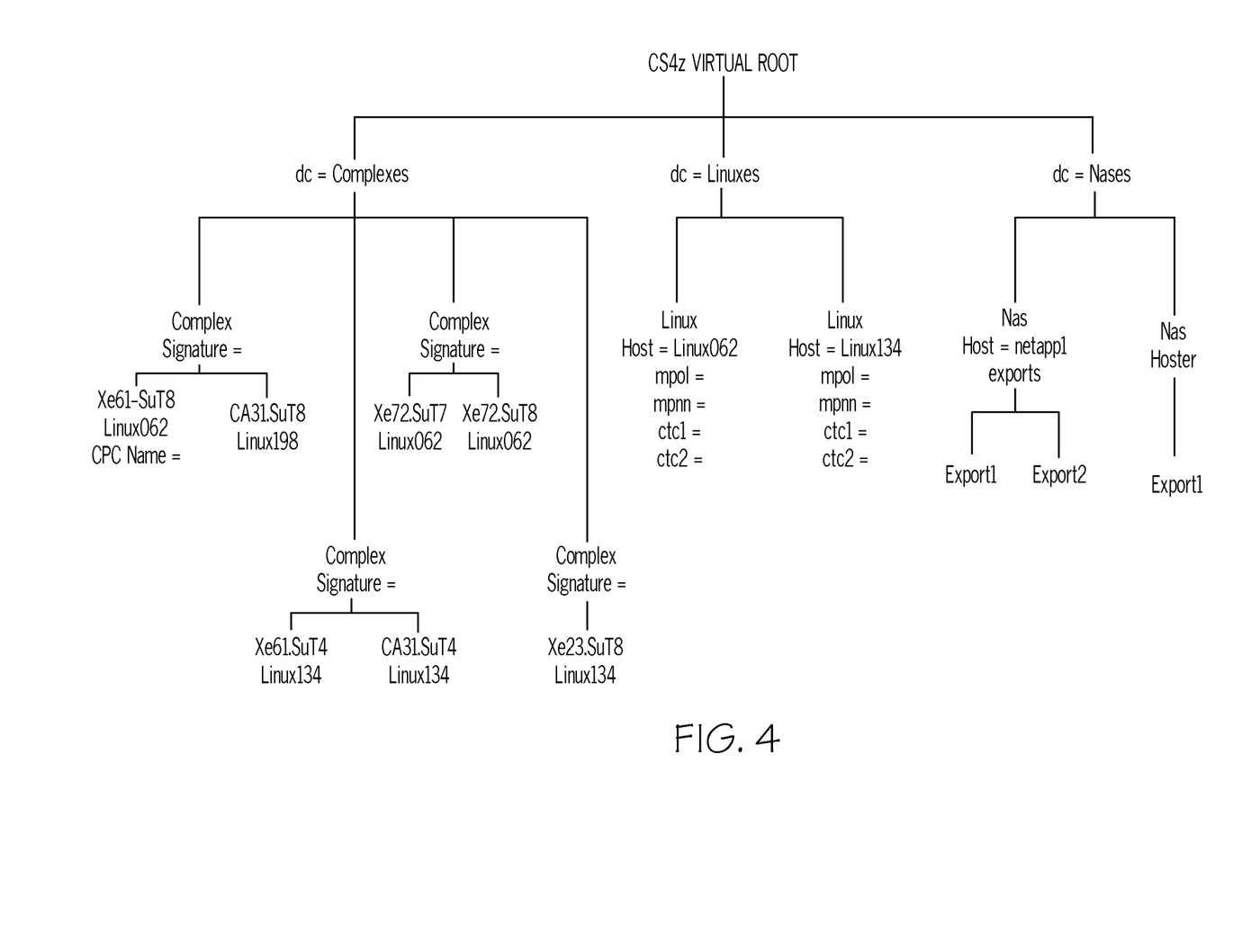
FIG. 4 illustrates a system topology built on a directory protocol in a non-limiting embodiment of the present disclosure.

FIG. 4 illustrates a system topology built on a directory protocol in a non-limiting embodiment of the present disclosure. The illustrated topology represents a user interface that may accommodate role based capabilities to monitor, configure, and manage several network components. The user interface may be accessible via the LDAP. The user interface may access system topology via LDAP. These monitoring, configuring, and management controls may be compatible with multiple open standards such as, for example, Computer Associates' Unified Infrastructure Management, OpenView, Chorus, and/or Vantage. Using the user interface, administrators may modify network components of the system topology. After modification, the network components may refresh themselves by re-reading the parts of the topology that pertain to them, in addition to adapting to the revised system topology. A separation between network components and their settings may further be utilized to allow deployment of additional components without the need to log on to each piece of the solution. This method permits configuration prior to starting a component. Further, this method may be utilized to repurpose or setup disaster backup and recovery environments. In some non-limiting embodiments of the present disclosure, the network components are part of a cloud storage system. In other non-limiting embodiments of the present disclosure, a role-based accessibility map may be formatted for display on the user interface, wherein the map depicts which of the plurality of network components are available in accordance with role-based access credentials.

LDAP may be the repository for the system topology, allowing role-based permissions and providing a mechanism to allow the user interface to the configure the solution such that it appears as a single window to a system administrator. SNMP writeable variables may be utilized as a mechanism to remotely instruct and/or inform a component to refresh its parameters from the LDAP repository.

Figure 5:
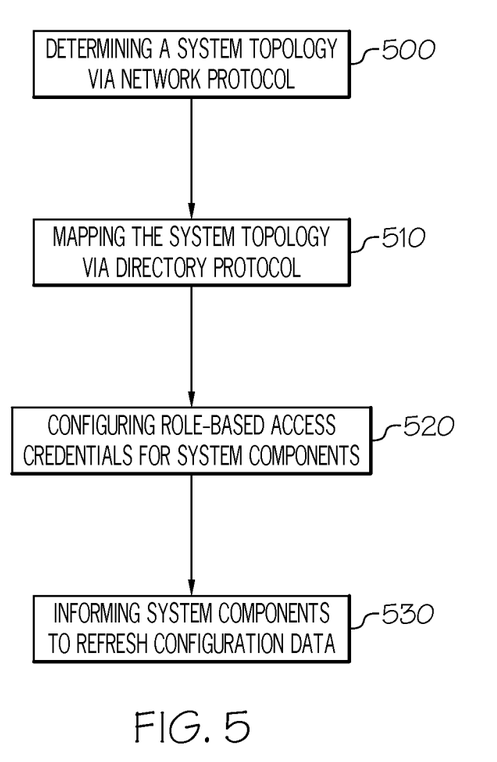
FIG. 5 illustrates a flow chart depicting the process of determining and configuring a system topology of a plurality of network components.

FIG. 5 illustrates a flow chart depicting the process of determining and configuring a system topology of a plurality of network components in a network system. Each of the network components may support a directory protocol. The system topology may include a respective address of each of the plurality of network components. In step 500, a system topology may be determined via a network protocol. The network protocol may comprise SNMP. In step 510, the system topology may be mapped via directory protocol. The directory protocol may comprise LDAP. In step 520, role-based access credentials for system components may be configured via the directory protocol. The role-based access credentials may determine which of the plurality of network components are accessible to a specific user. In step 530, the network protocol may instruct or inform at least one of the plurality of network components to refresh the respective configuration parameter on the directory protocol.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method, comprising:
   determining automatically, via a network protocol, a system topology of a network system, wherein the network system comprises a plurality of network components, wherein each of the network components support a directory protocol, wherein the system topology comprises a respective address of each of the plurality of network components;
   mapping the system topology via the directory protocol;
   configuring a role-based access credential for a user, via the directory protocol, wherein the role-based access credential determines which of the plurality of network components are accessible to the user;
   identifying a variation in the respective address of at least one of the plurality of network components; and
   in response to identifying the variation:
   instructing, via the network protocol, at least one of the plurality of network components to refresh address data on the directory protocol.

2. The method of claim 1, further comprising:
   monitoring, via the network protocol, each of the plurality of network components to identify the variation.

3. The method of claim 2, wherein instructing, via the network protocol, at least one of the plurality of network components to refresh configuration data further comprises use of an SNMP writable variable.

4. The method of claim 1, further comprising:
   monitoring, via the network protocol, each of the plurality of network components to identify a variation in a respective configuration parameter of at least one of the plurality of network components;
   in response to identifying the variation:
   instructing, via the network protocol, at least one of the plurality of network components to refresh the respective configuration parameter on the directory protocol.

5. The method of claim 1, further comprising:
   determining the respective addresses of each of the plurality of network components via a subnet mask.

6. The method of claim 1, wherein the network protocol comprises Simple Network Management Protocol (SNMP).

7. The method of claim 1, wherein the directory protocol comprises Lightweight Directory Access Protocol (LDAP) and wherein mapping the system topology via the directory protocol comprises:
   after determining the system topology, publishing the system topology to an LDAP server;
   mapping the system topology via LDAP; and
   implementing the role-based access credential using the LDAP server.

8. The method of claim 7, further comprising:
   providing a user interface configured to monitor and manage at least one of the plurality of network components, according to the respective role-based access credential.

9. The method of claim 8, wherein the user interface accesses the system topology via the LDAP.

10. The method of claim 1, further comprising:
    formatting for display, in accordance with the role-based access credential, a role-based map comprising at least one of the plurality of network components.

11. A system comprising:
    a processing system comprising hardware and software and configured to perform processes comprising:
    determining automatically, via a network protocol, a system topology of a network system, wherein the network system comprises a plurality of network components, wherein each of the network components support a directory protocol, wherein the system topology comprises a respective address of each of the plurality of network components;
    mapping the system topology via the directory protocol;
    configuring a role-based access credential for a user, via the directory protocol, wherein the role-based access credential determines which of the plurality of network components are accessible to the user; and
    identifying a variation in a respective address of at least one of the plurality of network components; and
    in response to identifying the variation:
    instructing, via the network protocol, at least one of the plurality of network components to refresh address data on the directory protocol.

12. The system of claim 11, further comprising:
    monitoring, via the network protocol, each of the plurality of network components for a variation in the respective address of at least one of the plurality of network components.

13. The system of claim 11, further comprising:
    identifying a variation in a respective configuration parameter of at least one of the plurality of network components;
    in response to identifying the variation in the respective configuration parameter:
    instructing, via the network protocol, at least one of the plurality of network components to refresh the respective configuration parameter on the directory protocol.

14. The system of claim 11, further comprising:
    determining the respective addresses of each of the plurality of network components via a subnet mask.

15. The system of claim 11, wherein the network protocol comprises Simple Network Management Protocol (SNMP).

16. The system of claim 11, wherein the directory protocol comprises Lightweight Directory Access Protocol (LDAP).

17. The system of claim 16, further comprising:
    providing a user interface configured to monitor and manage at least one of the plurality of network components, according to the respective role-based access credential.

18. The system of claim 17, wherein the user interface accesses the system topology via the LDAP.

19. The system of claim 11, further comprising:
    formatting for display, in accordance with the role-based access credential, a role-based map comprising at least one of the plurality of network components.

20. A computer program product comprising:
    a computer-readable storage medium having computer-readable program code embodied therewith, the computer-readable program code comprising:
    computer-readable program code configured to determine automatically, via a network protocol, a system topology of a network system, wherein the network system comprises a plurality of network components, wherein each of the network components support a directory protocol, wherein the system topology comprises a respective address of each of the plurality of network components;
    computer-readable program code configured to map the system topology via the directory protocol;

computer-readable program code configured to configure a role-based access credential for a user, via the directory protocol, wherein the role-based access credential determines which of the plurality of network components are accessible to the user;

computer-readable program code configured to monitor, via the network protocol, each of the plurality of network components to identify a variation in the respective address of at least one of the plurality of network components; and computer-readable program code configured to, in response to identifying the variation, instruct, via the network protocol, at least one of the plurality of network components to refresh address data on the directory protocol.

* * * * *